(12) United States Patent
Kikuchi

(10) Patent No.: US 12,154,229 B2
(45) Date of Patent: Nov. 26, 2024

(54) BAR ARRANGEMENT INSPECTION RESULT DISPLAY SYSTEM

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 18/474,815

(22) Filed: Sep. 26, 2023

(65) Prior Publication Data

US 2024/0112406 A1 Apr. 4, 2024

(30) Foreign Application Priority Data

Sep. 30, 2022 (JP) ................. 2022-159150

(51) Int. Cl.
*G06T 19/00* (2011.01)
*E04G 21/12* (2006.01)
*G06F 3/01* (2006.01)
*G06T 7/00* (2017.01)
(Continued)

(52) U.S. Cl.
CPC ............ *G06T 19/00* (2013.01); *E04G 21/12* (2013.01); *G06F 3/012* (2013.01); *G06T 7/0002* (2013.01); *G06T 7/74* (2017.01); *G06T 17/00* (2013.01); *G06T 2207/10028* (2013.01);
(Continued)

(58) Field of Classification Search
CPC ....... E04G 21/12; G06T 7/0002; G06T 19/00; G06T 7/74; G06T 17/00; G06T 7/001; G06T 2207/10028; G06T 2210/56; G06T 2207/20212; G06T 2207/20081; G06T 2207/30132; G06F 3/012; E04C 5/16; E04C 5/01
See application file for complete search history.

(56) References Cited

U.S. PATENT DOCUMENTS 11,403,826 B2 * 8/2022 Kikuchi ................ G06F 3/011
11,551,344 B2 * 1/2023 Karaaslan ................ G06T 7/11
(Continued)

FOREIGN PATENT DOCUMENTS

JP 2020-027058 A 2/2020
JP 2021-021622 A 2/2021

*Primary Examiner* — Vinh T Lam
(74) *Attorney, Agent, or Firm* — Studebaker & Brackett PC

(57) ABSTRACT

A bar arrangement inspection result display system includes a surveying instrument, an eyewear display device including a display, a relative position sensor and a relative direction sensor, and a processor for manage coordinate spaces of the eyewear display device and the surveying instrument in a space with an origin set at a common reference point. The processor is configured to generate a three-dimensional model of a bar arrangement inspection range based on three-dimensional point cloud data of the inspection range, generate three-dimensional inspection result display data by associating bar arrangement inspection result data of the inspection range in which detail and position of bar arrangement error are associated with each other with the three-dimensional model, and display three-dimensional inspection result image by superimposing on actual objects observed with the eyewear display device in such a manner that the bar arrangement error is recognizable.

8 Claims, 16 Drawing Sheets

(51) Int. Cl.
*G06T 7/73* (2017.01)
*G06T 17/00* (2006.01)

(52) U.S. Cl.
CPC .............. *G06T 2207/20081* (2013.01); *G06T 2207/20212* (2013.01); *G06T 2210/56* (2013.01)

(56) References Cited

U.S. PATENT DOCUMENTS

| | | | |
|---|---|---|---|
| 11,663,786 B2* | 5/2023 | Yasutomi | G06T 19/006 |
| | | | 345/633 |
| 11,966,508 B2* | 4/2024 | Kikuchi | G06F 3/013 |
| 2020/0013179 A1* | 1/2020 | Inose | G06T 7/593 |
| 2021/0348922 A1* | 11/2021 | Kikuchi | G02B 27/0172 |
| 2022/0276050 A1* | 9/2022 | Kikuchi | G06V 30/228 |
| 2023/0160694 A1* | 5/2023 | Kikuchi | G01S 17/89 |
| | | | 348/47 |
| 2024/0112327 A1* | 4/2024 | Kikuchi | G06T 7/001 |
| 2024/0188791 A1* | 6/2024 | Yangdai | G06T 7/0014 |

* cited by examiner

BAR ARRANGEMENT INSPECTION RESULT DISPLAY SYSTEM

CROSS-REFERENCE TO RELATED APPLICATION, BENEFIT CLAIM, AND INCORPORATION BY REFERENCE

The present application claims priority under 35 U.S.C. § 119 to Japanese Patent Application No. 2022-159150 filed Sep. 30, 2022. The contents of this application are incorporated herein by reference in their entirely.

TECHNICAL FIELD

The present invention relates to a bar arrangement inspection result display system, and more specifically, to a bar arrangement inspection result display system using an eyewear display device.

BACKGROUND

In a bar arrangement inspection in reinforcing bar construction, whether the types, the numbers, positions, pitches, and joints, etc., of reinforcing bars are correctly arranged as designed is inspected. Conventionally, an inspector inspected whether there was any error by checking a bar arrangement state at the site against a bar arrangement drawing, and imaged and recorded the state with a digital camera, etc.

In recent years, a technique of acquiring bar arrangement information including the numbers, diameters, and pitches, etc., of reinforcing bars by using shot images has been proposed (refer to, for example, Patent Literature 1).

CITATION LIST

Patent Literatures

Patent Literature 1: Japanese Published Unexamined Patent Application No. 2020-27058
Patent Literature 2: Japanese Published Unexamined Patent Application No. 2021-21622

SUMMARY OF INVENTION

Technical Problem

However, outputs with the bar arrangement inspection systems described in Patent Literatures 1 and 2 are according to display of data for creating a report for reporting inspection results and display on a tablet, etc., to allow an inspector to confirm inspection results. In a work to correct a bar arrangement error, such a report or display on the tablet must be confirmed, and this is not user-friendly for a worker. Therefore, development of a technique that enables displaying for making bar arrangement inspection results available to a worker at the site who corrects a bar arrangement error has been demanded.

The present invention was made in view of these circumstances, and an object thereof is to enable display of bar arrangement inspection results which facilitates the work of a worker at the site to correct a bar arrangement error.

Solution to Problem

In order to achieve the above-described object, a bar arrangement inspection result display system according to a first aspect of the present invention has the following configurations.

1. A bar arrangement inspection result display system includes a surveying instrument having a three-dimensional coordinate measuring function, an eyewear display device including a display, a relative position sensor configured to detect position of the eyewear display device, and a relative direction sensor configured to detect direction of the eyewear display device, and at least one processor configured to manage a coordinate space of information on the position and a direction of the eyewear display device and a coordinate space of the surveying instrument in a space with an origin set at a common reference point, wherein the processor is configured to: generate a three-dimensional model of a current state of a bar arrangement inspection range based on three-dimensional point cloud data of the bar arrangement inspection range acquired by a scanner in a state where a position and a direction of the scanner are known; generate three-dimensional inspection result display data by associating bar arrangement inspection result data of the bar arrangement inspection range in which detail and position of bar arrangement error are associated with each other with the three-dimensional model; and display three-dimensional inspection result display image by superimposing the three-dimensional inspection result display image on actual objects observed with the eyewear display on the display in such a manner that the bar arrangement error is recognizable.

2. In the configuration described in 1 above, it is also preferable that the processor generates correction supporting data for correcting the bar arrangement error based on three-dimensional bar arrangement design data of the inspection range, and based on the correction supporting data, displays a correction supporting image for supporting a work to correct the bar arrangement error on the display.

3. In the configuration described in 1 or 2 above, it is also preferable that the bar arrangement inspection result display system further includes a motion capture device, wherein the processor is capable of recognizing a worker's hand in a field of view of the eyewear display device by using the motion capture device, and recognizably displays a reinforcing bar that the worker has touched in the display.

4. In the configuration described in 1 through 3 above, it is also preferable that the bar arrangement inspection result display system further includes a motion capture device, wherein the processor is capable of recognizing a worker's hand in a field of view of the eyewear display device by using the motion capture device, and displays a work for correcting the bar arrangement error to the reinforcing bar that the worker has touched in the display.

5. In the configuration described in 1 through 4 above, it is also preferable that the processor is capable of recognizing a worker's hand in a field of view of the eyewear display device by image processing, and recognizably displays a reinforcing bar that the worker has touched in the display.

6. In the configuration described in 1 through 5 above, it is also preferable that the processor is capable of recognizing a worker's hand in a field of view of the eyewear display device by image processing, and displays a work for correcting the bar arrangement error to the reinforcing bar that the worker has touched in the display.

7 In the configuration described in 1 through 6 above, it is also preferable that the bar arrangement inspection result data is generated as a result of identifying a bar arrangement state and positions of reinforcing bars included in a point cloud composite image that the three-dimension point cloud data of the inspection range and an image data of the inspection range by using a bar arrangement state identification model obtained as a result of learning a large number of point cloud composite images for learning created for various bar arrangement states and comparing the point cloud composite image of the inspection range with the bar arrangement design data of the inspection range.

8. In the configuration described in 1 through 7 above, it is also preferable that the bar arrangement inspection result display system further includes at least one camera configured to acquire image data of the inspection range in a state where coordinates and a direction of the camera are known, wherein the surveying instrument is a scanner configured to acquire three-dimensional point cloud data of an inspection range in a state where coordinates and a direction of the scanner are known, and the processor is configured to generate a point cloud composite image by combining the three-dimensional point cloud data with the image data, and identify a bar arrangement state and positions of reinforcing bars included in the point cloud composite image, and, by comparing the point cloud composite image with the three-dimensional bar arrangement design data, generate the three-dimensional bar arrangement state inspection result data.

Benefit of Invention

According to the aspects described above, display of bar arrangement inspection results which facilitates a work of a worker at the site to correct a bar arrangement error can be made.

DESCRIPTION OF EMBODIMENTS

Hereinafter, preferred embodiments of the present invention will be described with reference to the drawings, however, the present invention is not limited thereto. The same configurations common to the respective embodiments and modification are provided with the same reference signs, and overlapping descriptions thereof are omitted as appropriate.

1. Embodiment(s)

1. Configuration of Bar Arrangement Inspection System 100 (Bar Arrangement Inspection Result Display System S)

Figure 1:
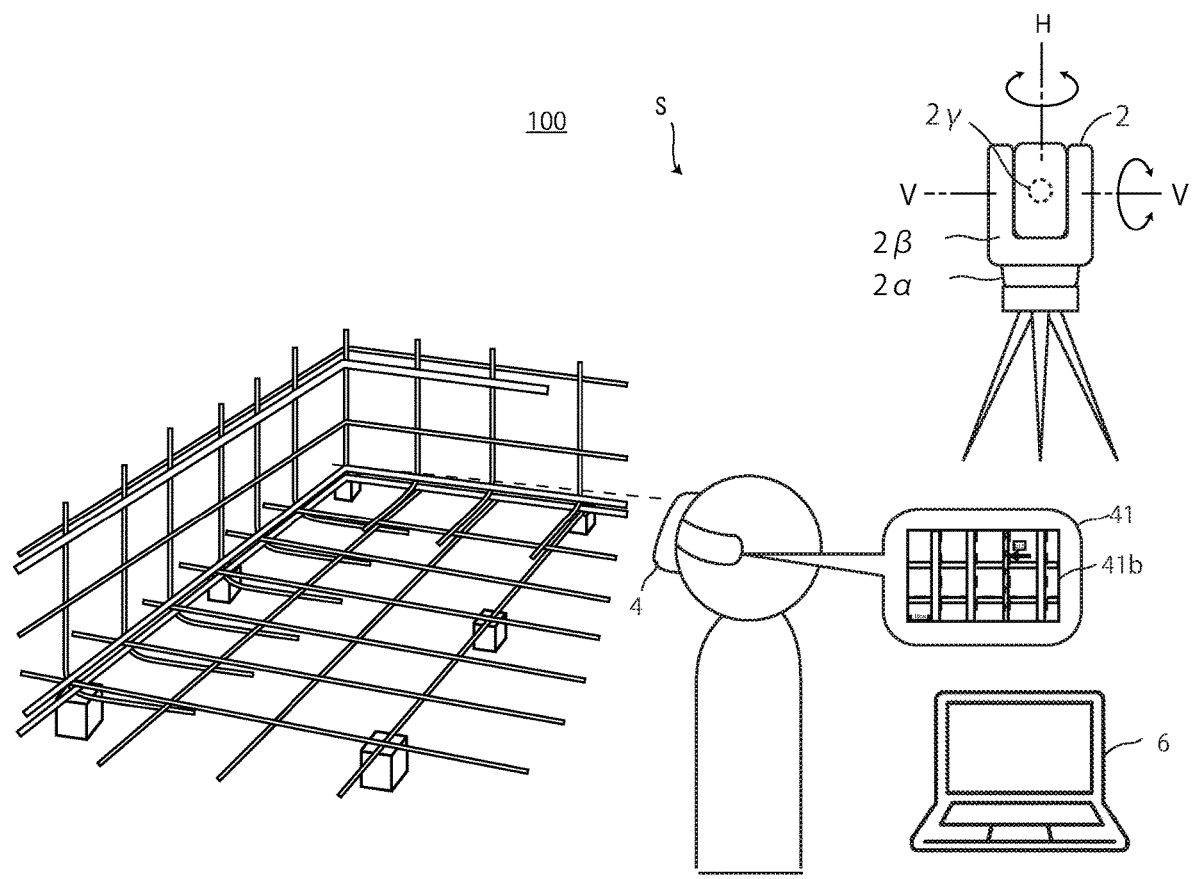
FIG. 1 is an external schematic view of a bar arrangement inspection system including a bar arrangement inspection result display system according to an embodiment of the present invention.
Figure 2:
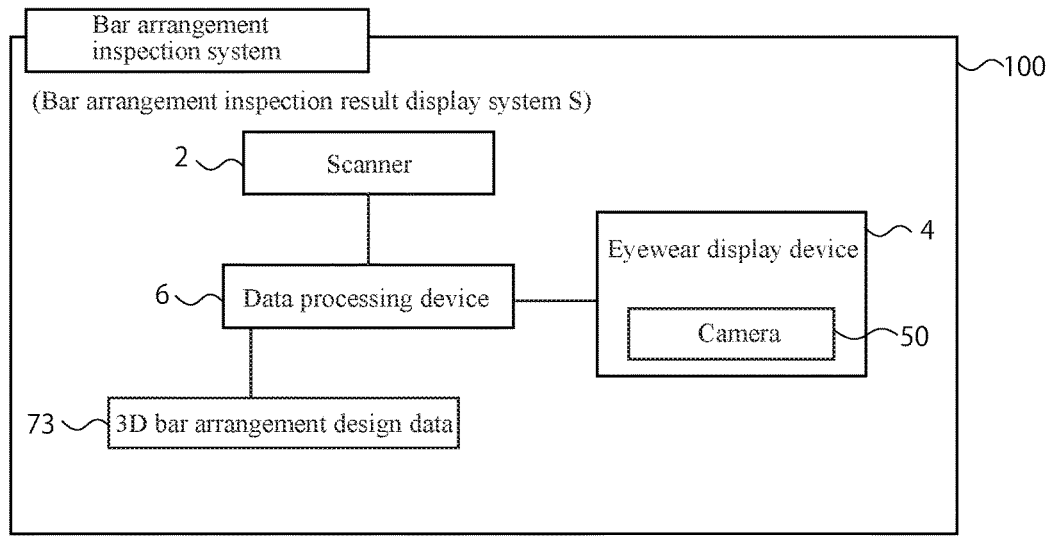
FIG. 2 is a block diagram of the same system.

FIG. 1 is a block diagram illustrating an outline of a usage state of a bar arrangement inspection system (hereinafter, simply referred to as an inspection system) 100 in which a bar arrangement inspection result display system (hereinafter, simply referred to as a display system) S is incorporated according to an embodiment of the present invention. The inspection system 100 includes at least one scanner 2, an eyewear display device (hereinafter, referred to as an eyewear device) 4 including a camera 50, and a data processing device 6. The scanner 2, the eyewear device 4, and the data processing device 6 are wirelessly connected, and can transmit and receive information to and from each other.

The scanner 2 is a terrestrial three-dimensional laser scanner. The scanner 2 is installed at an arbitrary point within a site of a foundation work that is an inspection range. An instrument installation point is made known by backward intersection or the like. The scanner 2 is installed via a leveling base mounted on a tripod, and includes a base portion 2a provided on the leveling base, a bracket portion 2P that horizontally rotates about an axis H on the base portion 2a, and a light projecting unit 2y that vertically rotates at a center of the bracket portion 2P.

The eyewear device 4 is a so-called head-mounted display to be worn on the head of a worker. An image of a bar arrangement state in the inspection range is acquired by using the camera 50. The camera 50 acquires an image of a range (referred to as an inspection object range) in the field of view of the camera 50 by one image shooting. A display 41 can display inspection results by superimposing them on actual reinforcing bars.

The data processing device 6 is a laptop computer in the illustrated example. The data processing device conducts a bar arrangement inspection by using three-dimensional point cloud data (hereinafter, simply referred to as point cloud data) acquired by the scanner 2 and an image acquired by the camera 50. Hereinafter, the respective components will be described in detail.

2. Scanner

Figure 3:
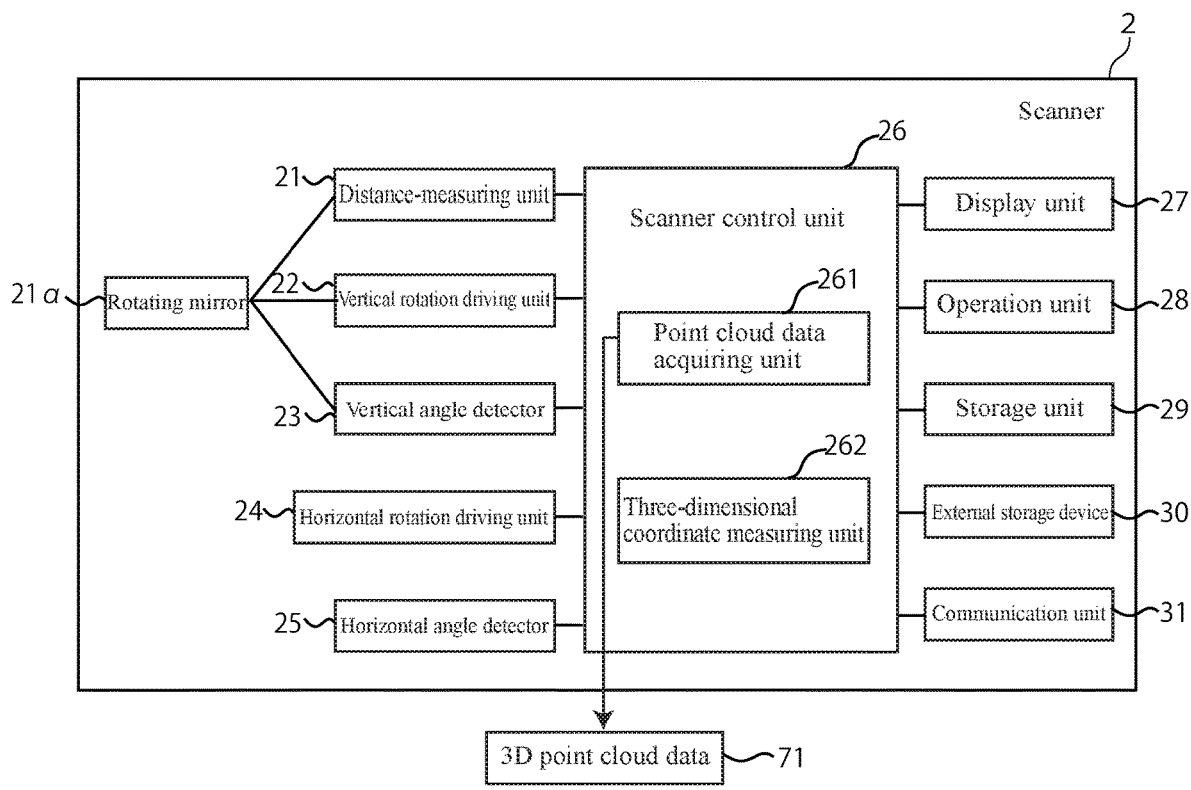
FIG. 3 is a block diagram of a scanner constituting the same system.

FIG. 3 is a configuration block diagram of the scanner 2. The scanner 2 includes a distance-measuring unit 21, a vertical rotation driving unit 22, a vertical angle detector 23, a horizontal rotation driving unit 24, a horizontal angle detector 25, a scanner control unit 26, a display unit 27, an operation unit 28, a storage unit 29, an external storage device 30, and a communication unit 31.

The distance-measuring unit 21 includes a light transmitting unit, a light receiving unit, a light transmitting optical system, a light receiving optical system sharing optical elements with the light transmitting optical system, and a rotating mirror 21a. The light transmitting unit includes a light emitting element such as a semiconductor laser, and emits pulsed light that is distance-measuring light as scanning light. The emitted distance-measuring light enters the rotating mirror 21a through the light transmitting optical system, and is deflected by the rotating mirror 21a and applied to irradiate a measuring object. The rotating mirror 21a is driven to rotate about an axis V by the vertical rotation driving unit 22.

Reflected light retroreflected by the measuring object enters the light receiving unit through the rotating mirror 21a and the light receiving optical system. The light receiving unit includes a light receiving element such as a photodiode. A portion of the distance-measuring light enters the light receiving unit as internal reference light, and based on the reflected light and the internal reference light, a distance to an irradiation point is obtained by the scanner control unit.

The vertical rotation driving unit 22 and the horizontal rotation driving unit 24 are motors, and are controlled by the scanner control unit. The vertical rotation driving unit 22 rotates the rotating mirror 21a about the axis V in the vertical direction. The horizontal rotation driving unit 24 rotates the bracket portion 2P about the axis H in the horizontal direction.

The vertical angle detector 23 and the horizontal angle detector 25 are rotary encoders. The vertical angle detector 23 measures a rotation angle of the rotating mirror 21a in the vertical direction. The horizontal angle detector 25 detects a rotation angle of the bracket portion 2P in the horizontal direction. Accordingly, a vertical angle and a horizontal angle of a distance measuring optical axis are detected.

The scanner control unit 26 includes at least one processor and at least one memory. The processor is, for example, a CPU (Central Processing Unit), or an MPU (Micro Processing Unit). The memory is, for example, an SRAM (Static Random Access Memory), a DRAM (Dynamic Random Access Memory), or the like. The processor reads data and programs stored in the storage unit 29, etc., to the memory and executes processing for realizing functions of the scanner 2.

Herein, the processor is not limited to a processor configured to perform software processing for all of processings that the processor performs. The processor may include a dedicated hardware circuit (for example, ASIC (Application Specific Integrated Circuit) that performs hardware processing for at least some of processings that the processor performs. That is, the processor may be configured as a circuitry including a combination of at least one processor that operates according to a computer program (software) and at least one dedicated hardware circuits that execute at least some of various processings.

The scanner control unit 26 calculates a distance to an irradiation point for each one-pulse light of distance-measuring light based on a time difference between a light emission timing of the light transmitting unit and a light reception timing of the light receiving unit (reciprocation time of pulsed light). In addition, the scanner control unit calculates an irradiation angle of the distance-measuring light at this time, and calculates an angle of the irradiation point.

The scanner control unit 26 includes, as functional units, a point cloud data acquiring unit 261 and a three-dimensional coordinate measuring unit 262. The point cloud data acquiring unit 261 acquires all-around point cloud data by acquiring coordinates of each irradiation point by performing all-around (360°) scanning (full-dome scanning) with distance-measuring light by controlling the distance-measuring unit 21, the rotating mirror 21a, the vertical rotation driving unit 22, and the horizontal rotation driving unit 24. The point cloud data acquiring unit 261 acquires three-dimensional point cloud data (hereinafter, referred to as 3D point cloud data) 71 of an inspection range and transmits the data to the data processing device 6. The three-dimensional coordinate measuring unit 262 realizes a target scanning function to acquire three-dimensional coordinates of a target by measuring a distance and angles to the target by high-density scanning of the periphery of the target.

The display unit 27 is, for example, a liquid crystal display. The operation unit 28 includes a power key, numeric keys, a decimal point key, +/− keys, an enter key, and cursor move keys, etc. The worker can input operation instructions and information to the scanner 2 from the operation unit 28.

The storage unit 29 is a computer-readable storage medium, which is, for example, an HDD (Hard Disc Drive), a flash memory, etc. The storage unit 29 stores programs for executing the functions of the scanner control unit 26. The external storage device 30 is, for example, a memory card, etc., and stores various data that the scanner 2 acquires.

The communication unit 31 is a communication control device such as a network adapter, a network interface card, a LAN card, or a Bluetooth (registered trademark) adapter, and connects the scanner 2 to the eyewear device 4 and the data processing device 6 by wire or wirelessly. The scanner control unit 26 can transmit and receive information to and from the eyewear device 4 and the data processing device 6 through the communication unit 31.

3. Eyewear Device 4

Figure 4A:
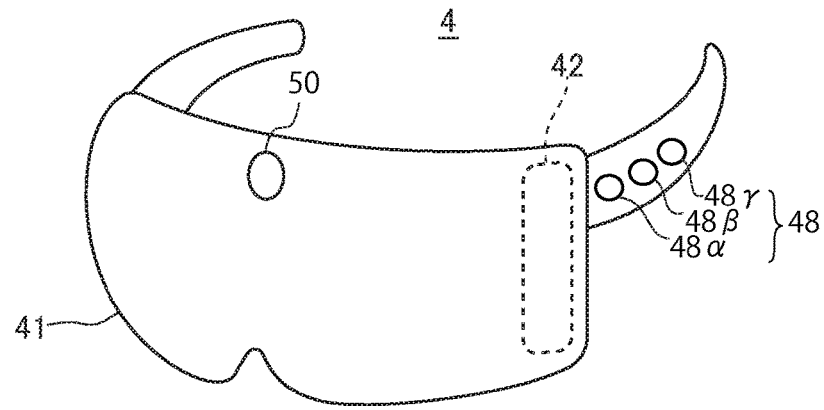
FIG. 4A is an external perspective view of an eyewear display device constituting the same system.
Figure 4B:
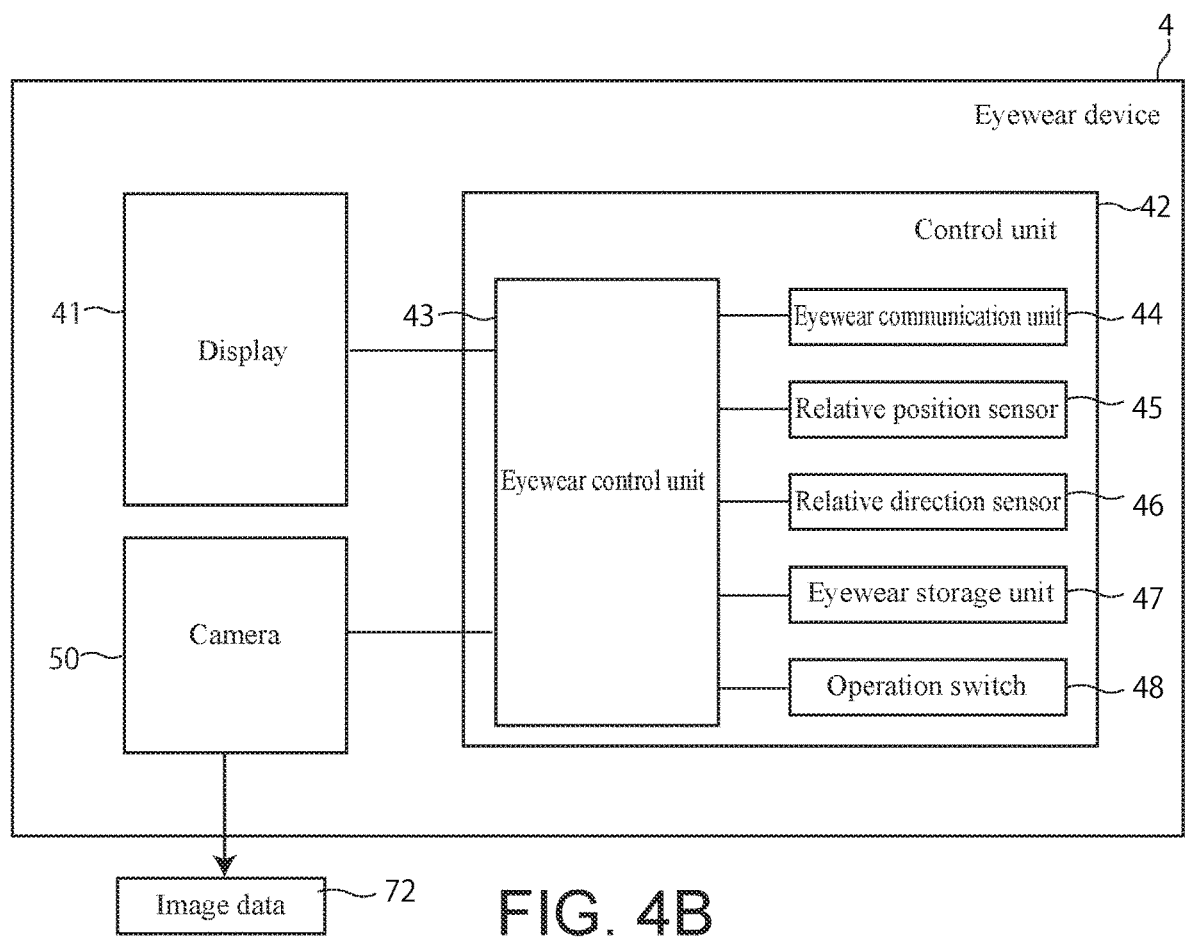
FIG. 4B is a block diagram of the same eyewear display device.

FIG. 4A is an external perspective view of the eyewear device 4, and FIG. 4B is a configuration block diagram of the eyewear device 4. The eyewear device 4 includes the display 41, the camera 50, and a control unit 42. The control unit 42 includes an eyewear control unit 43, an eyewear communication unit 44, a relative position sensor 45, a relative direction sensor 46, an eyewear storage unit 47, and an operation switch 48.

The display 41 is a goggles-lens-shaped transmissive display that covers the eyes of a worker when the worker wears it. As an example, the display 41 is an optical see-through display using a half mirror, and is configured to display an image received by the eyewear control unit 43 by superimposing it on a landscape of the site.

Alternatively, it is also possible that the display 41 is a video see-through display, and is configured to display an image received by the eyewear control unit 43 by superimposing it on a frontal landscape image acquired in real time by the camera 50. As a projection method, a virtual image projection method may be used, or a retinal projection method may be used.

The camera 50 is a digital camera including a lens, and an image sensor such as a CCD (Charge-Coupled Device) or a CMOS (Complementary Metal Oxide Semiconductor). The camera 50 is provided at a center of a front surface of the eyewear device 4, and shoots a frontal image of the eyewear device 4 in real time. The camera 50 sets a range of a field of view of the eyewear device 4 as an inspection object range, and acquires image data 72 of the inspection object range. The acquired image data 72 is transmitted to the data processing device 6. The image sensor has an orthogonal coordinate system with an origin set at an imaging center of the camera 50, and local coordinates of each pixel are identified. The imaging center of the camera 50 is the center of the eyewear device 4, and an imaging optical axis is the line-of-sight direction of the eyewear device 4.

The eyewear communication unit 44 is the same communication control device as the communication unit 31. The eyewear communication unit 44 connects the eyewear device 4 by wire or wirelessly, preferably wirelessly. The eyewear control unit 43 can transmit and receive information to and from the scanner 2 and the data processing device 6 through the eyewear communication unit 44.

The relative position sensor 45 detects a position (own position) of the eyewear device 4 in an observation site by performing radio determination from a GNSS (Global Navigation Satellite System) antenna, a Wi-Fi (registered trademark) access point, and an ultrasonic oscillator, etc., installed in the observation site.

The relative direction sensor 46 consists of a combination of a three-axis accelerometer or a gyro sensor and a tilt sensor. The relative direction sensor 46 detects a posture (own direction) of the eyewear device 4 while defining the up-down direction as a Z-axis direction, the left-right direction as a Y-axis direction, and the front-rear direction as an X-axis direction. As a result, the camera 50 can acquire an image in a state where its position and direction are known.

The eyewear storage unit 47 is a computer-readable storage medium, which is, for example, a memory card or the like. The eyewear storage unit 47 stores programs for the eyewear control unit 43 to perform the functions.

The operation switch 48 is, for example, a push button provided on a temple portion. The operation switch 48 includes, for example, a power button 48a for powering ON/OFF a power supply of the eyewear device 4, a shooting button 48P for shooting a still image with the camera 50, and an image changeover button 48y for switching images.

The eyewear control unit 43 includes, like the scanner control unit 26 of the scanner 2, at least one processor (for example, CPU) and at least one memory (for example, SRAM, DRAM, or the like). By reading programs stored in the eyewear storage unit 47 and developing them to the memory by the processor, various functions of the eyewear device 4 are realized.

The eyewear control unit 43 outputs information on the position and direction of the eyewear device 4 detected by the relative position sensor 45 and the relative direction sensor 46 to the data processing device 6. In addition, the eyewear control unit displays data received from the data processing device 6 on the display 41 of the eyewear device 4 by superimposing it on a landscape of the inspection site.

4. Data Processing Device 6

Figure 5:
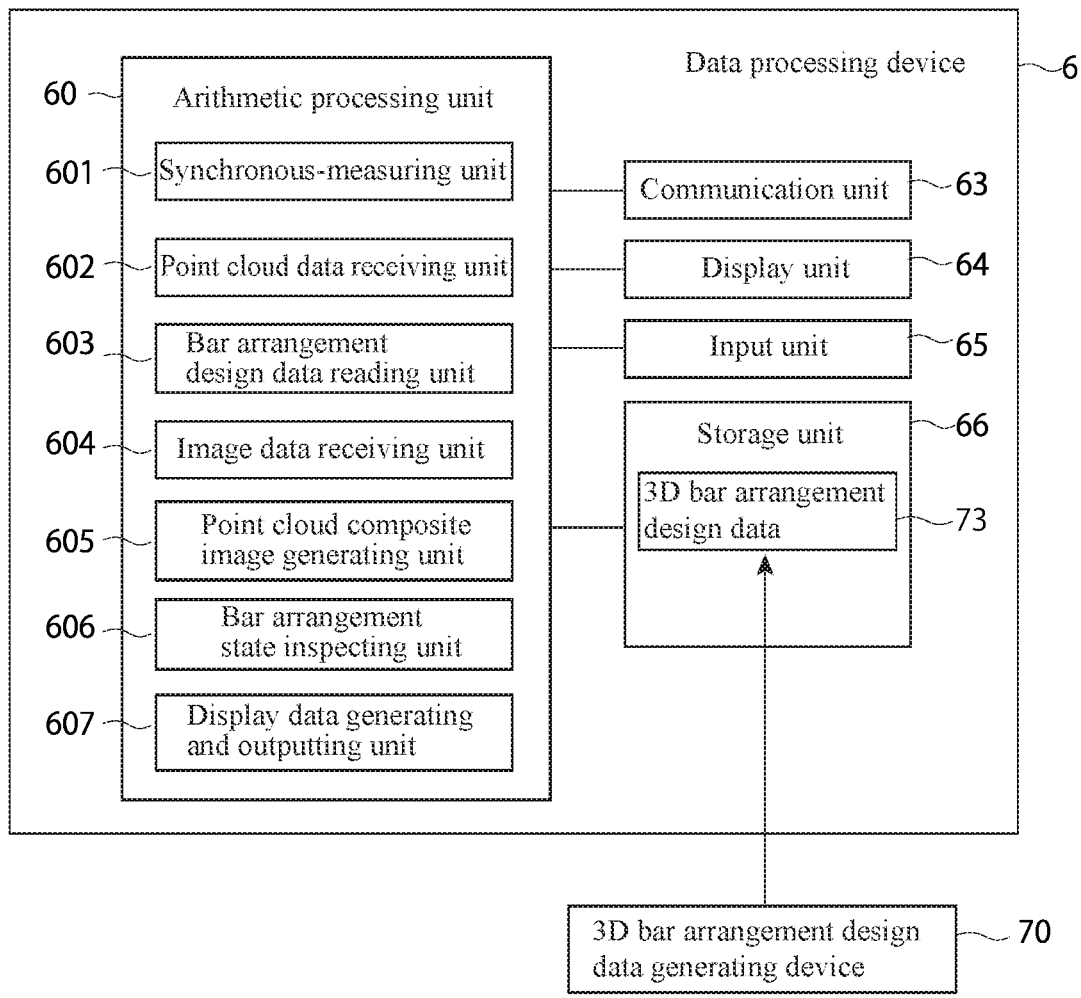
FIG. 5 is a block diagram of a data processing device constituting the system described above.

FIG. 5 is a configuration block diagram of the data processing device 6. The data processing device 6 is a so-called computer, and is typically a personal computer, a server computer, or the like, or may be a tablet terminal, a smartphone, or the like. An arithmetic processing unit 60 of the data processing device 6 corresponds to the system control unit set forth in the claims. The system control unit may be one computer like the data processing device 6, or may be a computer system in which a plurality of computers dispersively perform processings. In this case, the system may logically use some of processing resources of the one or more computers. The system control unit may be configured as a portion of the eyewear device 4, or as a portion of the scanner 2. A configuration may be made so that some of processings of the data processing device 6 are performed by the eyewear device 4, or some of the processings are performed by the scanner 2.

The data processing device 6 includes at least the arithmetic processing unit 60, a communication unit 63, a display unit 64, an input unit 65, and a storage unit 66.

The communication unit 63 is a communication control device equivalent to the communication unit 31 of the scanner 2, and enables the data processing device 6 to wirelessly communicate with the scanner 2 and the eyewear device 4. The arithmetic processing unit 60 can transmit and receive information to and from the scanner 2 and the eyewear device 4 through the communication unit 63.

The display unit 64 is, for example, a liquid crystal display. The input unit 65 is, for example, a keyboard, a mouse, etc., and can input various commands, selections, and determinations, etc., from a worker.

Like the scanner control unit 26 of the scanner 2, the arithmetic processing unit 60 is a control arithmetic unit including at least one processor (for example, CPU or GPU), and at least one memory (for example, SRAM, DRAM, or the like). By reading programs stored in the storage unit 66 and developing them to the memory by the processor, various functions of the data processing device 6, particularly functions of the following functional units, are realized.

The arithmetic processing unit 60 includes, as functional units, a synchronous-measuring unit 601, a point cloud data receiving unit 602, a bar arrangement design data reading unit 603, an image data receiving unit 604, a point cloud composite image generating unit 605, a bar arrangement state inspecting unit 606, and a display data generating and outputting unit 607.

The synchronous-measuring unit 601 synchronizes the scanner 2, the eyewear device 4 (camera 50), and the data processing device 6. Synchronization is an operation to enable management of information including position coordinates such as a position and a posture of the eyewear device 4 (camera 50), and design data, etc., to be handled by the data processing device 6 in a common coordinate space with an origin set at a common reference point. An example considered to be preferable is shown below, and it is only required that the synchronization is made by a proper method based on knowledge of a person skilled in the art.

First, for the inspection system 100, a reference point and a reference direction are set on an inspection site, and the scanner 2 and the data processing device 6 are synchronized. As the reference point, a known point (a point whose coordinates are known) or an arbitrary point at the site is selected. A characteristic point different from the reference point is selected, and a direction from the reference point toward this characteristic point is defined as the reference direction. Absolute coordinates of the scanner 2 are grasped by observation according to backward intersection including the reference point and the characteristic point by using the target scanning function of the scanner 2, and are transmitted to the data processing device 6. The synchronous-measuring unit 601 recognizes coordinates of the reference point as (x, y, z)=(0, 0, 0), and recognizes the reference direction as a horizontal angle of 0°. Accordingly, in relation to the information from the scanner 2, the data processing device 6 is enabled to manage a relative position and a relative direction of the scanner 2 in the space with an origin set at the reference point.

Next, the eyewear device 4 and the data processing device 6 are synchronized. The eyewear device 4 is installed at the reference point, and in a state where the eyewear device 4 is leveled, the line-of-sight direction of the eyewear device 4 is matched with the reference direction, and (x, y, z) of the relative position sensor 45 is set to (0, 0, 0), and (roll, pitch, yaw) of the relative direction sensor is set to (0, 0, 0). Afterwards, in relation to information from the eyewear device (camera 50), the data processing device 6 is accordingly enabled to manage the relative position and the relative direction of the eyewear device 4 (camera 50) in the space with an origin set at the reference point.

The point cloud data receiving unit 602 receives three-dimensional point cloud data of the entire inspection range acquired by performing full-dome scanning with the scanner 2 through the communication unit 63.

The bar arrangement design data reading unit 603 reads 3D (three-dimensional) bar arrangement design data (hereinafter, referred to as bar arrangement design data) 73 described later, stored in the storage unit 66.

The image data receiving unit 604 receives image data 72 acquired with the camera 50 through the communication unit 63.

Figure 6A:
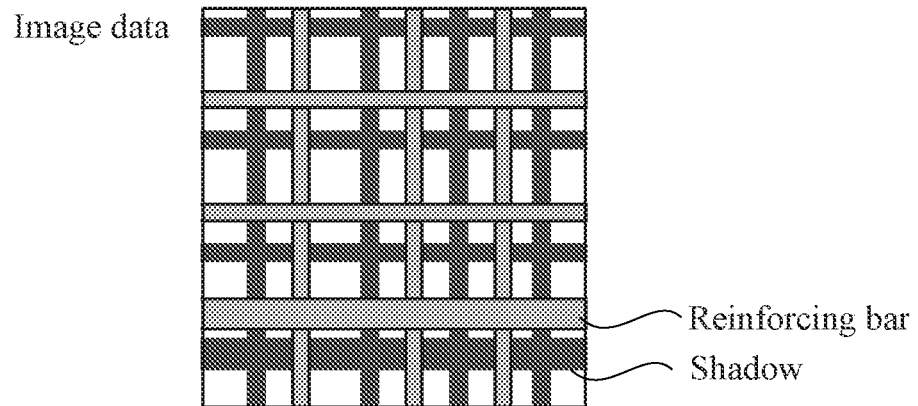
FIGS. 6A, 6B and 6C are views describing differences among image data, point cloud data, and a point cloud composite image.
Figure 6B:
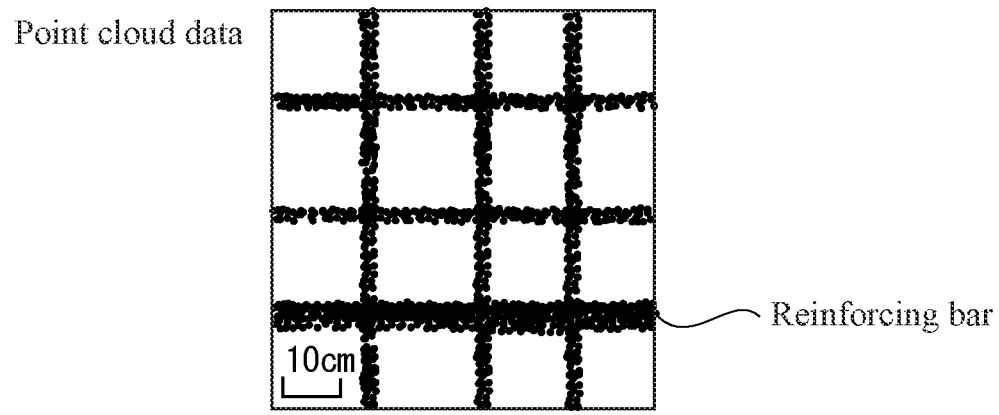
Figure 6C:
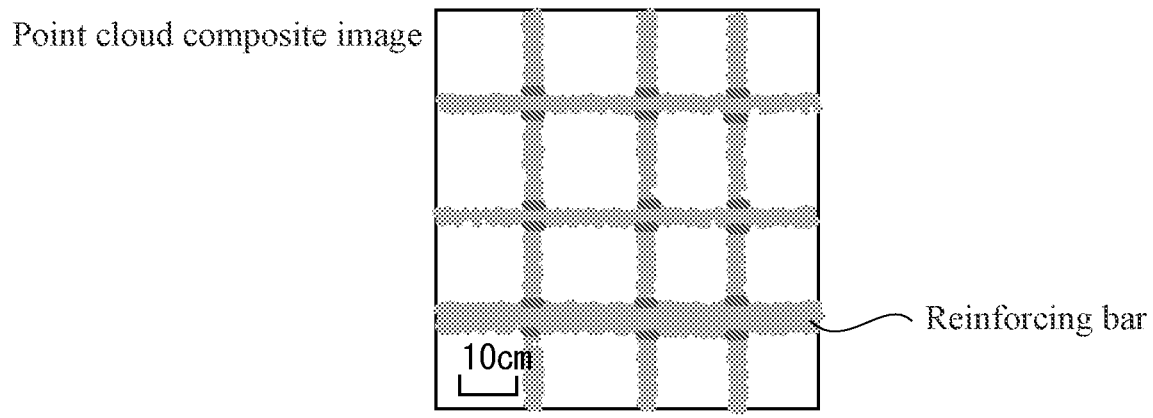

The point cloud composite image generating unit 605 generates a point cloud composite image by combining the image data 72 with the 3D point cloud data 71. FIG. 6A illustrates an image of image data, FIG. 6B illustrates an image of point cloud data, and FIG. 6C illustrates an image of a point cloud composite image. The image data 72 is data including color information, and shadow, etc., may be reflected thereon. On the other hand, the point cloud data is not influenced by shadow, but does not include color information. Coordinates of each point of the point cloud data have been identified, so that actual dimensions can be known. The point cloud composite image includes color information that the image data has and information on actual dimensions grasped from the point cloud data. That is, by using a point cloud composite image in order to identify a bar arrangement state, dimensions can be identified without setting of a reference marker such as a ruler.

The bar arrangement state inspecting unit 606 inspects a bar arrangement state by using a point cloud composite image, and outputs three-dimensional bar arrangement inspection result data (hereinafter, referred to as 3D bar arrangement inspection result data or bar arrangement inspection result data) 75. Details of the bar arrangement state inspecting unit 606 will be described later.

The display data generating and outputting unit 607 generates display data to be displayed on the display 41 of the eyewear device 4 based on the bar arrangement inspection result data.

The storage unit 66 is, for example, an HDD, an SSD (Solid State Drive), or the like. In the storage unit 66, the above-described 3D bar arrangement design data (hereinafter, referred to also as bar arrangement design data) 73 is stored. In addition, in the storage unit 66, when the respective functional units of the arithmetic processing unit 60 are realized as software, programs for executing the respective functions are stored.

The bar arrangement design data 73 is a bar arrangement detailed drawing created by using 3D CAD data. The bar arrangement detailed drawing illustrates a detailed arrangement state of reinforced concrete members. The bar arrangement state includes, for example, the types (materials and thicknesses) of reinforcing bars, pitches between reinforcing bars, the numbers of reinforcing bars, arrangement of spacers for preventing insufficient reinforcement cover depth, main reinforcement directions, the types of reinforcing bar joints, and binding positions, etc. The bar arrangement design data 73 includes at least one of these information.

The bar arrangement design data 73 is in advance generated by the 3D bar arrangement design data generating device 70 and stored in the storage unit 66. The 3D bar arrangement design data generating device 70 is a computer including at least one processor and at least one memory, equivalent to the data processing device 6.

Figure 7:
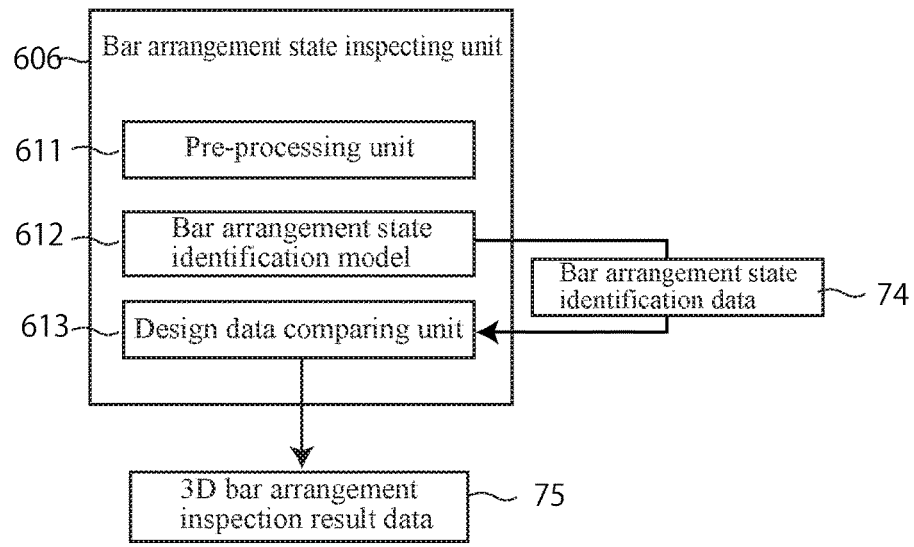
FIG. 7 is a diagram describing a bar arrangement state inspecting unit of the same data processing device.

Next, details of the bar arrangement state inspecting unit 606 will be described with reference to FIGS. 7 and 8. As illustrated in FIG. 7, the bar arrangement state inspecting unit 606 includes a preprocessing unit 611, a bar arrangement state identification model 612, and a design data comparing unit 613.

The preprocessing unit 611 applies image processing for realizing easy recognition of reinforcing bars to a point cloud composite image input as an inspection object. Publicly known image processing, for example, grayscale conversion, extraction of edges and line segments, and brightness value averaging, etc., are applied. In addition to this, the point cloud composite image may be enlarged or reduced in size to be a predetermined scale size. The synthetic image data is data including position coordinates, that is, actual dimensional information, so that enlargement/reduction to a predetermined scale size is possible without concurrently shooting a reference marker such as a ruler.

Figure 8:
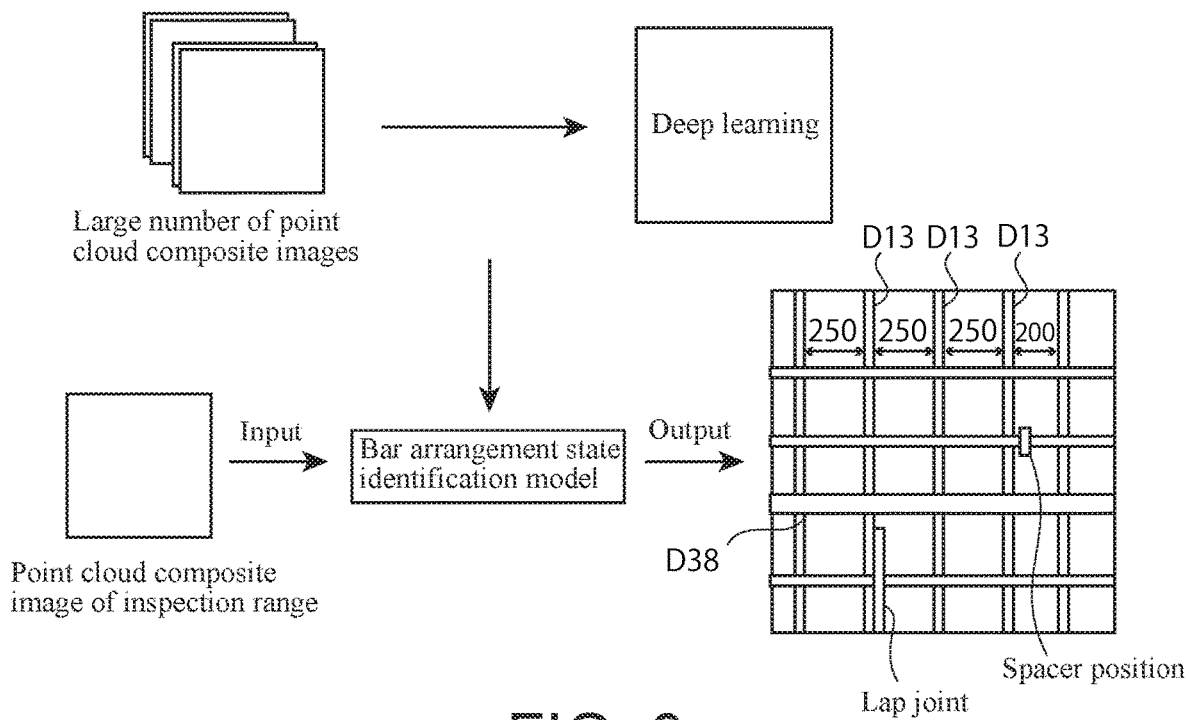
FIG. 8 is a diagram describing a method for generating a bar arrangement state identification model of the same data processing device.

The bar arrangement state identification model 612 is a learned model that is obtained by learning, as illustrated in FIG. 8, for example, a large number of point cloud composite images for learning created by imaging a large number of bar arrangement states and acquiring point cloud data. As the point cloud composite images for learning, point cloud composite images labeled based on the types (materials, shapes, and thicknesses (diameter dimensions)) of reinforcing bars, bar arrangement pitches and the numbers of reinforcing bars, arrangement of spacers for preventing insufficient reinforcement cover depth, main reinforcement directions, the types of reinforcing bar joints, and binding positions, etc., are used. As data for learning, a large number of point cloud composite images generated in the same manner as the point cloud composite image by imaging various bar arrangement states in general bar arrangement methods are used. Image data may also be used together.

When a point cloud composite image of the inspection range is input to the bar arrangement state identification model 612, the types (materials and thicknesses) of reinforcing bars, bar arrangement pitches and the numbers of reinforcing bars, arrangement of spacers for preventing insufficient reinforcement cover depth, main reinforcement directions, and the types of reinforcing bar joints in the inspection range, are identified, and these matters are associated with positions and output. Learning is performed by a computer that includes, like the data processing device 6, at least one processor and at least one memory. As a learning method, for example, deep learning using convolutional neutral networks (CNN), recurrent neutral networks (RNN), and Boltzmann machines, etc., can be used.

The types of reinforcing bars are named such as D3, D13, D38, SR295 . . . , etc., based on their materials, shapes, and diameter dimensions according to the JIS standards. These names may be used for the labels of the types of reinforcing bars.

In preprocessing, in a case where a point cloud composite image is enlarged/reduced in size to be a predetermined scale size, by using image data with the same predetermined scale size as learning data to be used for learning, the accuracy of the bar arrangement state identification is increased.

When a point cloud composite image of an inspection range is input to the bar arrangement state identification model 612, bar arrangement state identification data 74 is output which includes, for example, as in an example illustrated in the lower right portion of FIG. 8, detected bar arrangement state information, that is, information on the types of reinforcing bars (materials, shapes, and thicknesses (diameter dimensions)), bar arrangement pitches between reinforcing bars, the numbers of reinforcing bars, arrangement of spacers for preventing insufficient reinforcement cover depth, main reinforcement directions, the types of reinforcing bar joints, and binding positions, etc., and their positional information.

The design data comparing unit 613 compares the point cloud composite image with the bar arrangement design data 661 and outputs a difference between these (bar arrangement error) and a position of the difference as the bar arrangement inspection result data 75. Specifically, differences, etc., in the type of reinforcing bar, bar arrangement pitch and the number of reinforcing bars, arrangement of spacers for preventing insufficient reinforcement cover depth, main reinforcement direction, type of reinforcing bar joint, and binding position are associated with position information in the inspection range and output.

5. Bar Arrangement Inspection Method (Processing of Bar Arrangement Inspection System 100)

Figure 9:
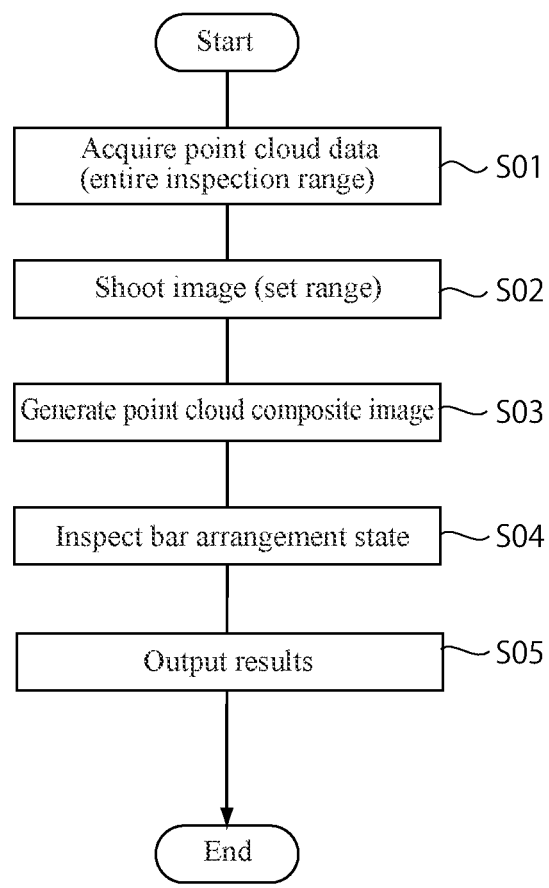
FIG. 9 is a flowchart of an outline of a bar arrangement inspection method using the system described above.

Next, a bar arrangement inspection method will be described. FIG. 9 is a flowchart of an outline of a bar arrangement inspection method using the inspection system 100 according to the present embodiment.

In Step S01, the scanner 2 is installed at a known point, and by executing full-dome scanning, point cloud data 71 of the inspection range (preferably, the entire inspection range) is acquired. This entire inspection range does not strictly mean the entirety of the inspection range, but may be a range that a worker needs in the inspection range. The acquired point cloud data 71 is transmitted to the data processing device 6. If possible, the point cloud data 71 of the entire site may be acquired by one full-dome scanning. The point cloud data 71 may be acquired by using a plurality of scanners 2. Alternatively, the point cloud data 71 may be acquired by performing full-dome scanning multiple times while changing the installation point.

Next, in Step S02, the worker shoots an image of a partial range (inspection object range) set in the inspection range with the camera 50. Specifically, the partial range set in the inspection range is a range of an angle of view of the camera 50, and is a range that the worker will image for inspection. Acquired image data 72 is transmitted to the data processing device 6.

Next, in Step S03, the data processing device 6 combines the received 3D point cloud data 71 with image data 72 to generate a point cloud composite image.

Next, in Step S04, the data processing device 6 inspects a bar arrangement state by using the point cloud composite image, and outputs bar arrangement inspection result data 75.

Next, in Step S05, the data processing device 6 generates display data based on the bar arrangement inspection result data 75, and outputs the display data. The output of the inspection results may be displayed on the display 41 of the eyewear device 4, displayed on the display unit 64 of the data processing device 6, or may be output an output as a report from the data processing device 6 to external equipment such as a printer.

6. Bar Arrangement Inspection Method (Processing of Data Processing Device 6)

Figure 10:
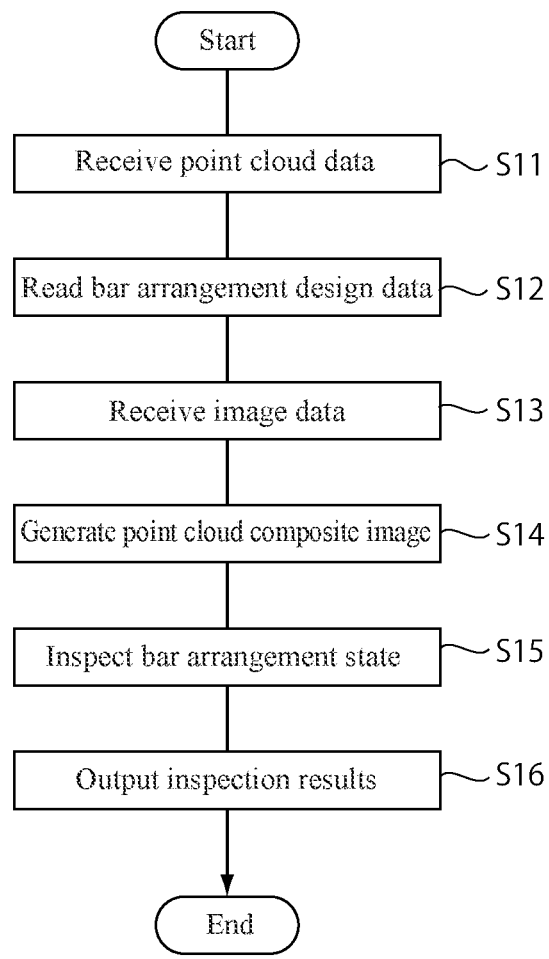
FIG. 10 is a flowchart of processing of a data processing device in the same method.
Figure 11:
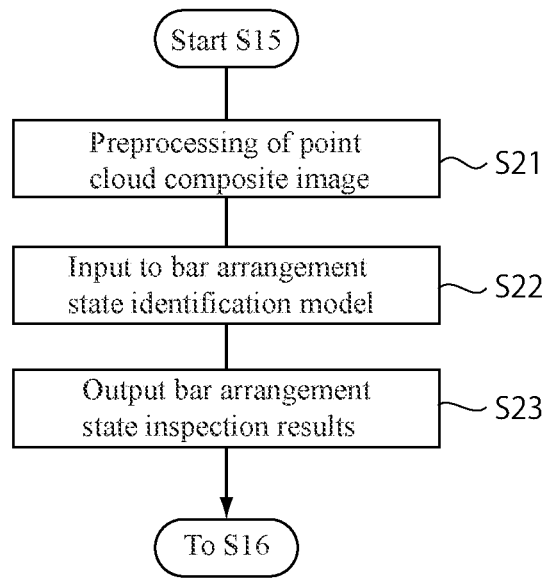
FIG. 11 is a flowchart of details of processing of a bar arrangement state inspection in the same method.

FIG. 10 is a flowchart of processing of the data processing device 6 in the above-described bar arrangement inspection method. FIG. 11 is a detailed flowchart of Step S15.

As the processing starts, first, in Step S11, the point cloud data receiving unit 602 receives the all-around point cloud data 71 from the scanner 2, and stores it in the storage unit 66.

Next, in Step S12, the bar arrangement design data reading unit 603 reads the bar arrangement design data 73 from the storage unit 66. The order of Steps S11 and S12 is not limited to this, and the data may be read when the bar arrangement state inspecting unit 606 conducts the inspection.

Next, in Step S13, the image data receiving unit 604 receives the image data 72 of the inspection object range from the camera 50.

Next, in Step S14, the point cloud composite image generating unit 605 combines the image data 72 of the inspection object range with the point cloud data 71 corresponding to the inspection object range to generate a point cloud composite image.

Next, in Step S15, the bar arrangement state inspecting unit 606 inspects a bar arrangement state in the inspection object range by comparing the point cloud composite image of the inspection object range with corresponding 3D bar arrangement design data 73.

Specifically, in Step S21, the preprocessing unit 611 applies image processing for realizing easy recognition of reinforcing bars to the point cloud composite image input as an inspection object.

Next, in Step S22, the point cloud composite image of the inspection object range is input to the bar arrangement state identification model 612, and the bar arrangement state in the inspection object range is identified and output as bar arrangement state identification data 74.

Next, in Step S23, the 3D bar arrangement design data 73 read in Step S12 is compared with the bar arrangement state identification data 74 output in Step S22, a portion having a difference (bar arrangement error) is identified, associated with a position of this portion, and stored as bar arrangement state inspection result data 75 in the storage unit 66, and Step S15 is ended. The resultantly obtained bar arrangement state inspection results are accumulated for each inspection object range, and the entire inspection site is inspected while the inspection object range is moved, and accordingly, the three-dimensional bar arrangement state inspection result data 75 of the entire inspection site can be acquired.

Next, in Step S16, the display data generating and outputting unit 607 generates display data to be displayed on the display of the eyewear device 4. Details will be described later.

7. Details of Display Data Generation

Figure 12:
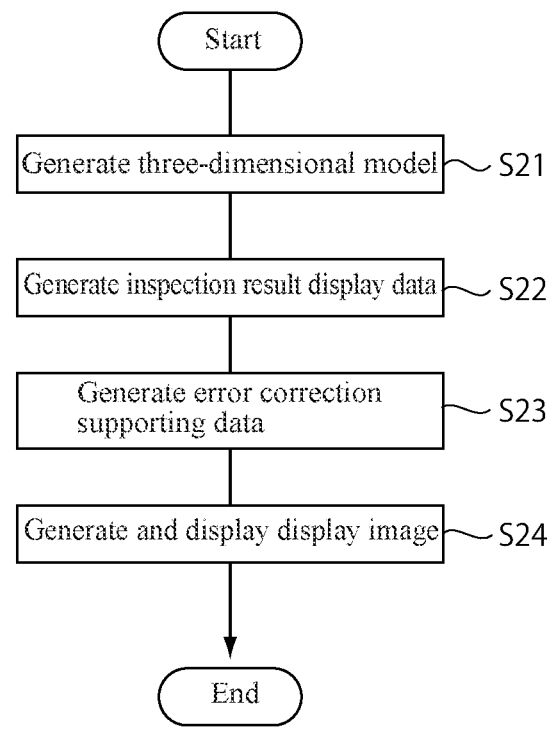
FIG. 12 is a flowchart of processing for generating bar arrangement inspection result display data using the same system.

FIG. 12 is a flowchart of detailed processing to be performed by the display data generating and outputting unit 607.

In Step S21, the display data generating and outputting unit 607 generates a three-dimensional model of a current state as 3D current-state data based on the 3D point cloud data 71 of the current state acquired from the scanner 2 and stored in the storage unit 66.

Next, in Step S22, the display data generating and outputting unit 607 generates 3D inspection result display data by associating the bar arrangement inspection result data 75 output from the bar arrangement state inspecting unit 606 and stored in the storage unit 66 with the three-dimensional model of the current state described above.

Next, in Step S23, the display data generating and outputting unit 607 generates 3D correction supporting data based on the 3D bar arrangement design data 73 stored in advance in the storage unit.

Then, in Step S24, the display data generating and outputting unit 607 generates a display image corresponding to a field of view of the display 41 by using the 3D current-state data, the 3D inspection result display data, and the 3D correction supporting data, and displays the display image on the display 41 by superimposing it on actual objects.

FIGS. 13A to 13C and 14A to 14C are views illustrating images of display images generated in this way. In the drawings, the dashed lines represent actual objects (reinforcing bars) viewed in the field of view of the display 41, and the solid lines represent display images generated by the display data generating and outputting unit 607. In actuality, the display images are displayed by being superimposed on actual objects, but for convenience of description, the display images are drawn to be slightly displaced.

Figure 13A:
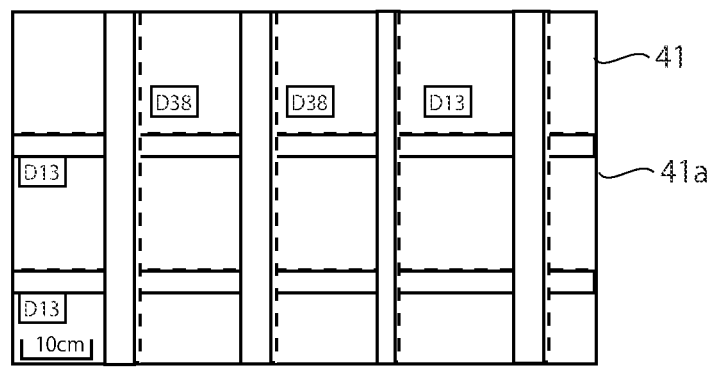
FIGS. 13A, 13B and 13C are views illustrating examples of bar arrangement inspection result display by the same system.
Figure 13B:
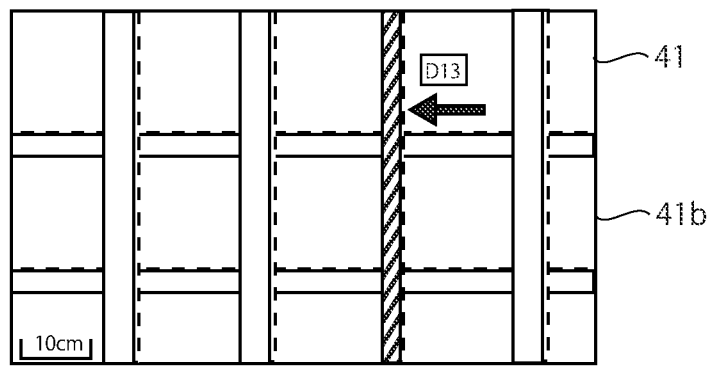
Figure 13C:
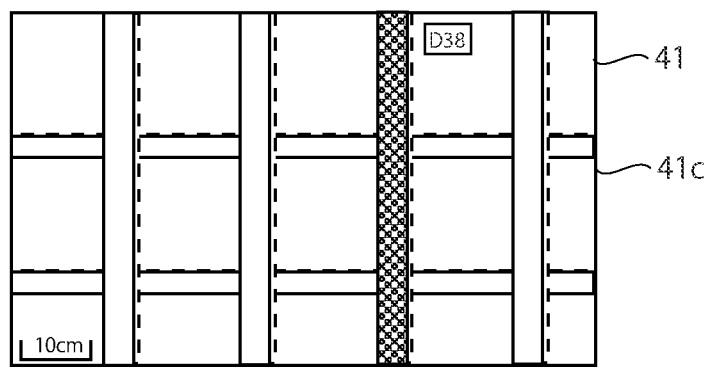

FIG. 13A to 13C illustrate images when a worker wearing the eyewear device 4 is facing straight reinforcing bars corresponding to a wall surface and observes a bar arrangement state. FIG. 13A illustrates a current-state image 41a generated based on the 3D current-state data and depicting a current state, and the current-state image 41a is displayed by being superimposed on actual objects. The 3D current-state data may include identification results of the bar arrangement state obtained by using the bar arrangement state identification model 612 although this is not essential. As an example of this, in FIG. 13A, the types (D13, D38) of reinforcing bars and the values of pitches between the reinforcing bars are displayed.

FIG. 13B illustrates display of an inspection result image 41b created based on the 3D inspection result display data. As inspection results, the reinforcing bar at the right end is a bar arrangement error, and in addition to the 3D current-state data, the reinforcing bar at the right end is displayed in a highlighted manner in FIG. 13B so that the reinforcing bar at the right end being D13 can be recognized as an error. Specifically, it may be possible that a reinforcing bar in a proper bar arrangement state is displayed in green, etc., and a reinforcing bar with an error is displayed in a noticeable color such as red or yellow, or flashed.

FIG. 13C illustrates display of a correction supporting image 41c created based on the 3D correction supporting data. The correction supporting image 41c represents a proper bar arrangement state based on bar arrangement design data to support a work to correct a bar arrangement error. FIG. 13C indicates that the reinforcing bar at the right end should be D38 by right, and this reinforcing bar is displayed in a highlighted manner so as to become noticeable.

In the eyewear device 4, the current-state image 41a, the inspection result image 41b, and the correction supporting image 41c may be switchable according to control of the arithmetic processing unit 60 or the eyewear control unit 43. In this case, for example, a worker may switch these by pushing the image changeover button 48y.

Figure 14A:
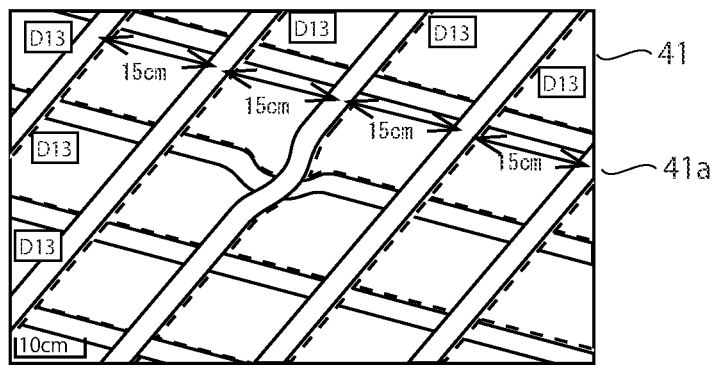
FIGS. 14A, 14B and 14C are views illustrating examples of bar arrangement inspection result display by the same system.
Figure 14B:
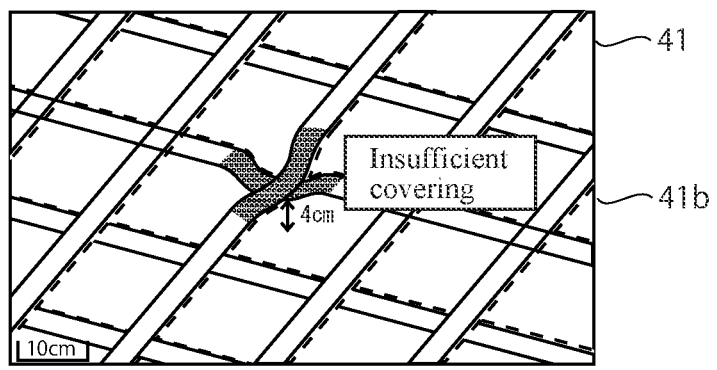
Figure 14C:
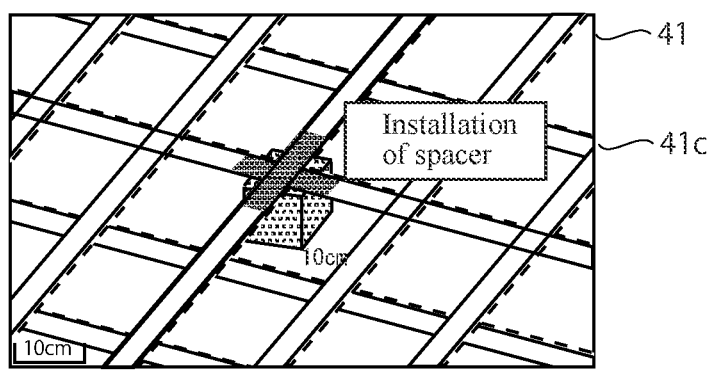

FIGS. 14A to 14C illustrate display images when a worker wearing the eyewear device 4 observes a bar arrangement state of reinforcing bars disposed at a floor surface from diagonally above. FIG. 14A illustrates display of a current-state image 41a generated based on the 3D current-state data and representing a current state, and the current-state image 41a is displayed by being superimposed on actual objects.

FIG. 14B illustrates display of an inspection result image 41b created based on the 3D inspection result display data. In the inspection result image 41b, a portion with insufficient covering is displayed in a highlighted manner, for example, by being changed in color, so as to indicate that, as inspection results, a crossover portion of reinforcing bars at a center is drooping to cause insufficient covering. At this time, as illustrated in FIG. 14B, the display may be made so that details of the bar arrangement error, that is, the "insufficient covering" is recognizable although this is not essential.

FIG. 14C illustrates display of a correction supporting image created based on the 3D correction supporting data. In FIG. 14C, the correction supporting image 41c indicates that by installing a spacer at the corresponding portion so as to make the cover depth appropriate in order to support a work to correct the bar arrangement error, the error will be eliminated.

Besides, the inspection result image 41b and the correction supporting image 41c may relate to errors in the bar arrangement pitch and the number of reinforcing bars, an error in the main reinforcement direction, an error in the type of reinforcing bar joint, an error in the binding position, and methods for correcting these and a bar arrangement state after correction. These may not be all displayed but some of these may be displayed. Alternatively, the display may be switched for each type of bar arrangement error.

Figure 15:
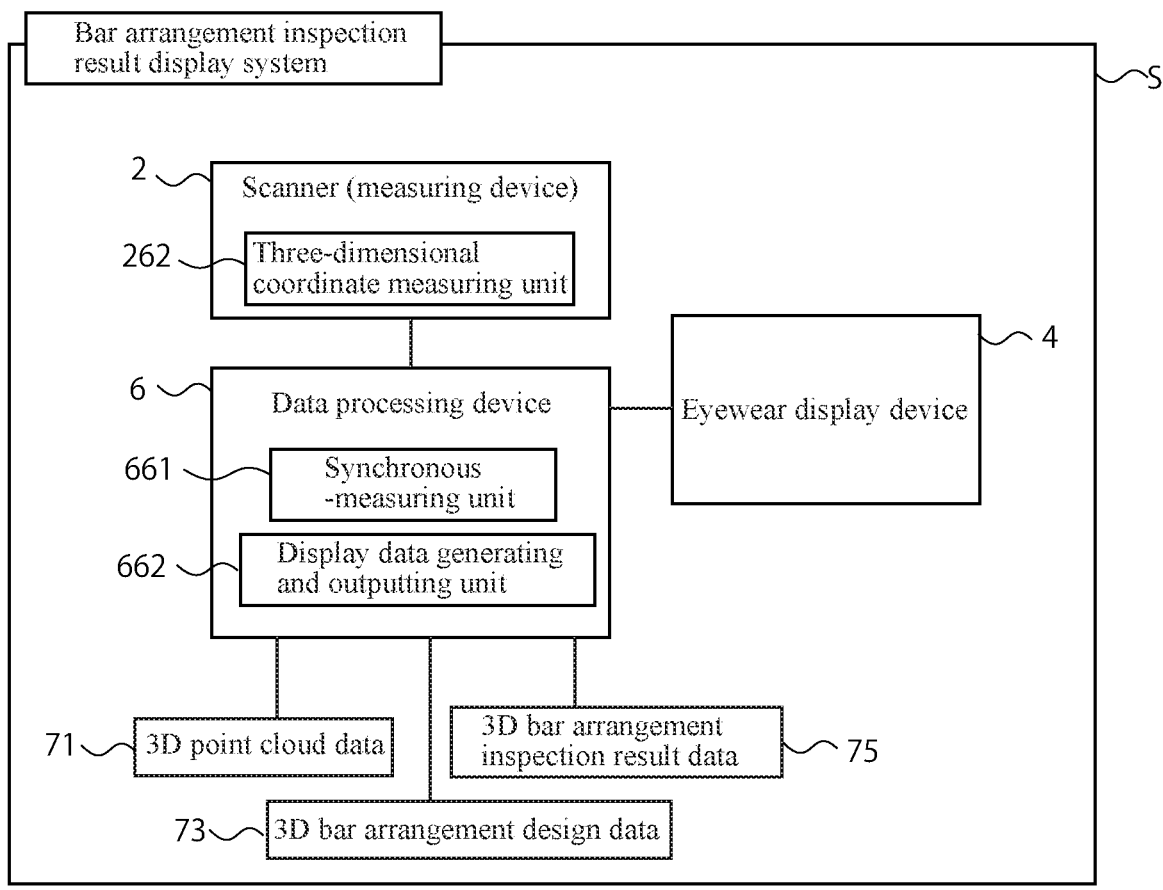
FIG. 15 is a block diagram of the bar arrangement inspection result display system according to the present embodiment.

Here, a block diagram of the display system S according to the embodiment is depicted again in FIG. 15. The display system S includes the scanner (measuring device) 2, the eyewear device 4, and the data processing device 6. The scanner 2 functions as a measuring device for synchronizing data in absolute coordinate systems to be handled by the eyewear device 4 and the data processing device 6. From this viewpoint, the scanner 2 as a measuring device relating to the bar arrangement inspection result display system S is required to include the three-dimensional coordinate measuring unit 262 in the scanner control unit 26. The data processing device 6 includes the synchronous-measuring unit 601 for synchronization with the eyewear device 4 and the scanner 2, and the display data generating and outputting unit 607. In addition, the data processing device 6 is required to have 3D point cloud data, 3D bar arrangement design data 73, and bar arrangement inspection result data 75 acquired in relation to an inspection range.

The measuring device is not limited to the scanner 2, and may be a surveying instrument including a three-dimensional coordinate measuring unit capable of acquiring three-dimensional position coordinates of a measuring object. For example, a total station having a distance and angle measuring function may be used. Alternatively, as illustrated in Japanese Published Unexamined Patent Application No. 2021-77127, a camera including two cameras and capable of acquiring three-dimensional position coordinates of a measuring object by photographic surveying may be used.

The 3D point cloud data 71, the 3D bar arrangement design data 73, and the 3D bar arrangement inspection result data 75 do not necessarily have to be acquired by the inspection system 100 that includes the display system S as in the case of the present embodiment, and may be acquired separately and stored in advance in the storage unit. However, acquisition of these data by the inspection system 100 including the display system S is advantageous because inspection results can be displayed in real time.

8. Effects

As described, according to the display system S of the present embodiment, details of a bar arrangement error and a position of the error are identifiably displayed by being superimposed on actual objects, on the display 41 of the eyewear display device 4 that a worker wears on his/her head. As a result, the worker can confirm the portion of the bar arrangement error just by looking at the portion that the worker desires to confirm without checking it against a report or a display on the tablet, so that the burden on the worker is reduced.

In addition, since the display is made so that details of the bar arrangement error can be grasped, a work necessary for correction can be easily grasped.

In particular, the display system S further displays a correct bar arrangement state as a support for correction of the bar arrangement error, so that the worker can perform a correcting work to realize the correct bar arrangement state without difficulty.

Additionally, according to the display system S of the present embodiment, the display system S is included in the inspection system 100, and the eyewear display device 4 for displaying bar arrangement results is provided with the camera 50 for acquiring an image of an inspection range, so that just by imaging the inspection range that the worker desires to confirm with the camera 50, the worker can confirm a bar arrangement error superimposed on actual objects on the display 41 through the series of processings, and this is convenient.

9. Modification

Figure 16:
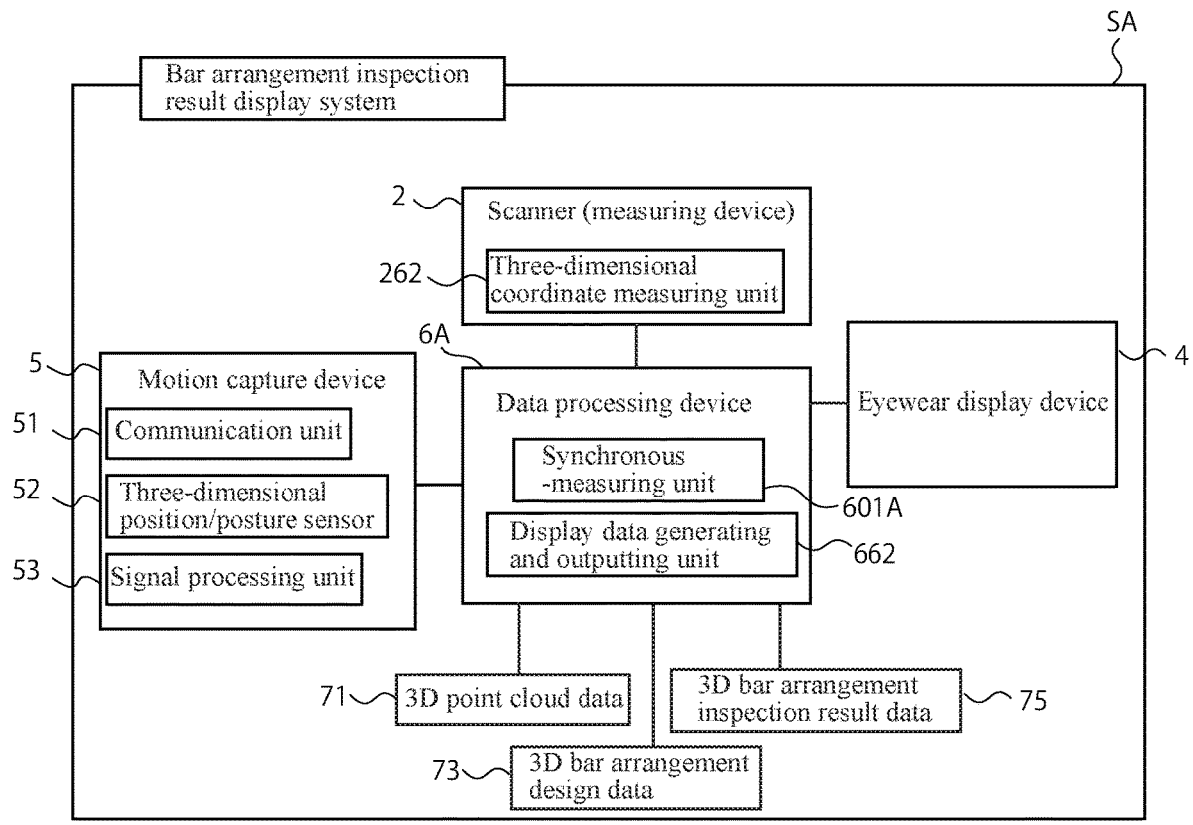
FIG. 16 is a block diagram of a bar arrangement inspection result display system according to a modification of the system.

FIG. 16 is a block diagram of a display system SA according to a modification.

The display system SA includes a motion capture device 5 in addition to the configuration of the display system S. A data processing device 6A includes a synchronous-measuring unit 601A in place of the synchronous-measuring unit 601.

The motion capture device 5 is a so-called magnetic motion capture device. The motion capture device 5 includes a communication unit 51 that enables communication with the data processing device 6A, a plurality of magnetic three-dimensional position/posture sensors 52 as devices to be worn on the fingers of a worker, and a signal processing unit 53 that outputs signals detected with the three-dimensional position/posture sensors 52 as motion information of the worker to the data processing device in a chronological order. As the three-dimensional position/posture sensors 52, for example, the magnetic position/posture sensor disclosed in Japanese Published Unexamined Patent Application No. 2007-236602 is preferably used.

The motion capture device 5 is configured by arranging the plurality of three-dimensional position/posture sensors 52 on a flexible glove, and can detect delicate motions of the fingers.

Figure 17:
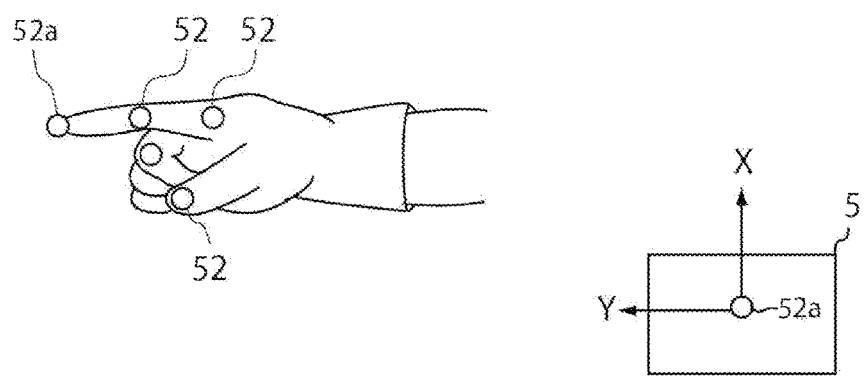
FIG. 17 is a view describing a motion capture device relating to the same system.

As illustrated in FIG. 17, for example, a center of a sensor 52a positioned at the tip end of the index finger is assumed to be an origin, and the motion capture device 5 obtains information on Euler angles that indicate a posture obtained from position coordinates (x, y, z) of the three-dimensional position/posture sensors 52 as viewed from a fixed reference point of the signal processing unit 53 and rotation angles around the X axis, the Y axis, and the Z axis. The Z axis is an axis passing through an origin of an XY plane and orthogonal to the XY plane in FIG. 17.

In addition to the functions of the synchronous-measuring unit 601, the synchronous-measuring unit 601A converts and manages information on positions and directions received from the motion capture device A so that the information matches a coordinate space of the scanner 2 and the eyewear device 4 synchronized with each other. For synchronization of the motion capture device 5, the tip end of the index finger of the worker wearing the motion capture device 5 is disposed at the reference point, the tip end of the index finger is directed to match the reference direction of the scanner 2, to have position coordinates and the Euler angles as zero.

Accordingly, a position that the worker wearing the motion capture device 5 has touched with his/her hand can be grasped by the eyewear device 4.

Figure 18A:
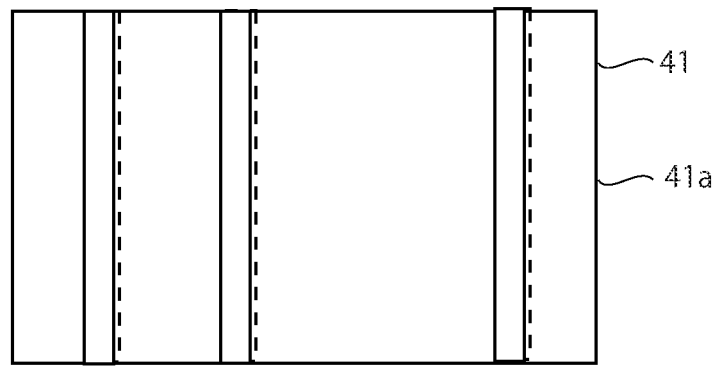
FIGS. 18A, 18B, 18C and 18D are views illustrating examples of bar arrangement inspection result display by the same system.
Figure 18B:
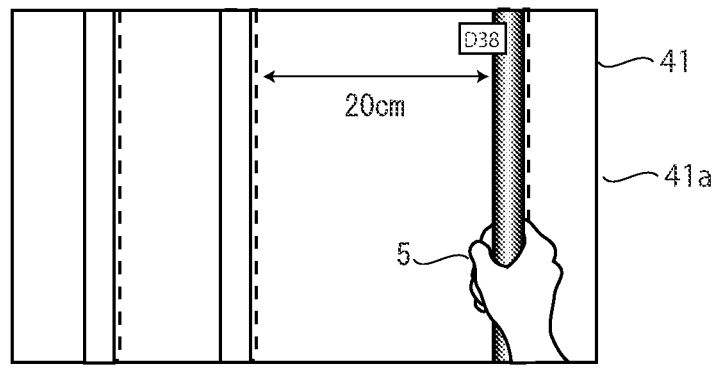

FIGS. 18A to 18D illustrate examples of display on the display 41 by the display system SA. FIG. 18A illustrates a current-state image 41a. FIG. 18B illustrates a current-state image 41a that depicts a state where a reinforcing bar at the right end is grabbed with the hand wearing the motion capture device 5. The reinforcing bar touched with the motion capture device 5 is displayed in a highlighted manner. In addition, a bar arrangement state of the reinforcing bar touched with the motion capture device 5 (in the drawings, the type and interval of the reinforcing bar) are displayed.

Figure 18C:
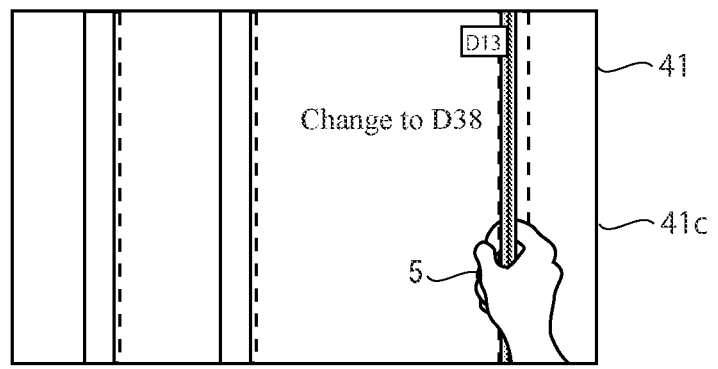
Figure 18D:
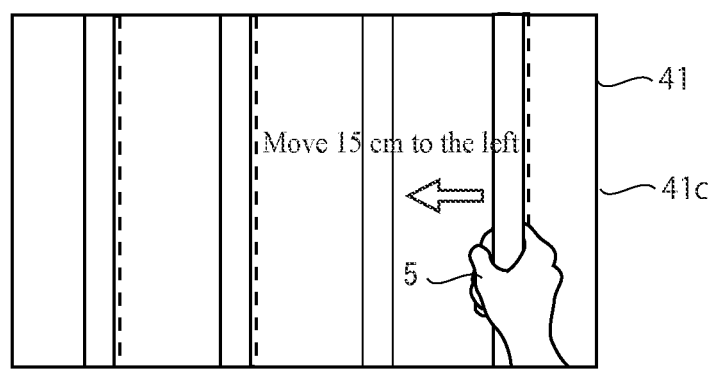

FIGS. 18C and 18D illustrate correction supporting images 41c. In FIGS. 18C and 18D, with respect to the reinforcing bar touched with the motion capture device 5, a work to correct the bar arrangement error is displayed.

Accordingly, the reinforcing bar that the worker has touched among a large number of reinforcing bars displayed in the image can be easily recognized, and a work to correct the bar arrangement error of this reinforcing bar can be easily grasped.

In this modification, a motion capture device is used for recognition of the hand, however, without limitation to this, image processing may be used to recognize the hand based on a skin color and shape so as to identify a reinforcing bar touched with the hand.

10. Another Example of Inspection System

The 3D point cloud data 71 and the bar arrangement inspection result data 75 used in the display system according to the present embodiment do not necessarily have to be acquired by the inspection system 100 according to the embodiment described above. The three-dimensional point cloud data only has to be acquired by a laser scanner in a state where its position and a direction are known in an inspection range, and as the bar arrangement inspection result data 75, bar arrangement inspection results acquired as three-dimensional data can be used when they are available.

For example, three-dimensional data acquired by using an inspection system 200 to be described below as the inspection system may be used.

Figure 19:
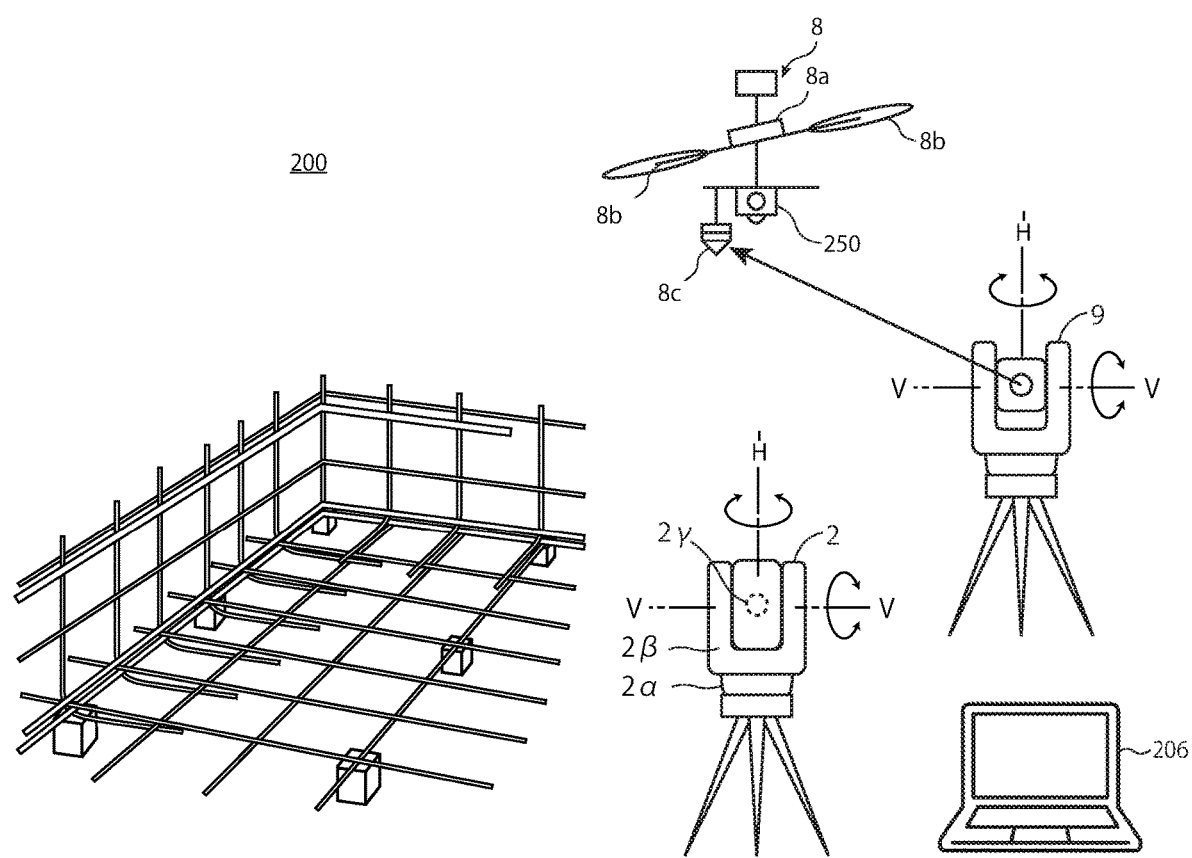
FIG. 19 is an external schematic view of another example of the inspection system for acquiring three-dimensional point cloud data and three-dimensional bar arrangement inspection result data.
Figure 20:
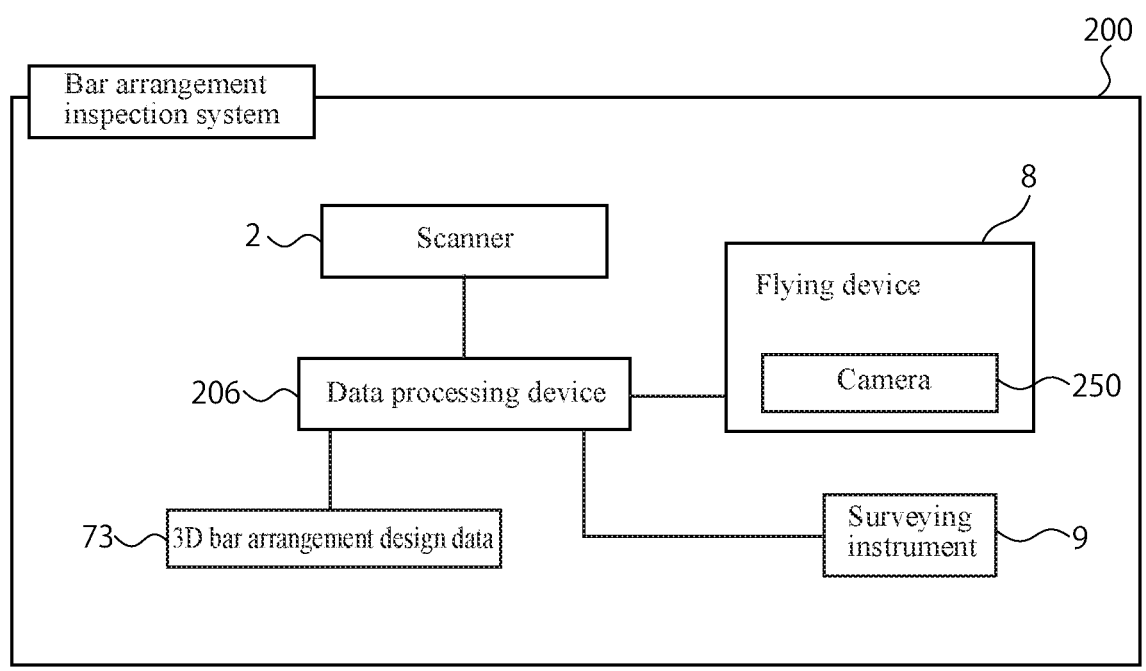
FIG. 20 is a configuration block diagram of the same inspection system.

FIG. 19 is an external view illustrating a usage state of the bar arrangement inspection system 200 according to a second embodiment, and FIG. 20 is a block diagram.

The system 200 includes a scanner 2, a data processing device 206, a flying device 8 with a camera 250, and a surveying instrument 9. The scanner 2, the data processing device 206, and the flying device 8 with a prism, and the surveying instrument 9 are connected wirelessly, and can transmit and receive information to and from each other. The scanner 2 is the same as the scanner 2 according to the first embodiment.

The flying device 8 is a UAV (Unmanned Air Vehicle) that can fly autonomously. The flying device 8 includes a plurality of propellers 8b radially extending from a main body 8a, a prism 8c as a target, and the camera 250 that shoots image data of an inspection object. The flying device 8 can fly a predetermined flight route, and freely fly according to remote operations. The flying device 8 includes an IMU device and a timer not illustrated in the main body 8a. A positional relationship between the IMU (Inertial Measuring Unit) and the camera 250 is known so that a direction and a posture of the camera 250 can be known.

The surveying instrument 9 is a motor-driven total station with an automatic tracking function. While the flying device 8 is caused to fly over an inspection range, image data of the inspection range can be acquired by synchronizing an image shooting timing of the camera 250 with an image shooting timing of the surveying instrument.

The data processing device 206 has a configuration equivalent to that of the data processing device 6, and can acquire bar arrangement inspection result data 75 equivalent to that of the inspection system 100 by using 3D point cloud data 71 acquired by the scanner 2 and image data acquired by the camera 250.

Three-dimensional point cloud data and image data of the entire inspection range are only required to be acquired with a scanner whose position and direction are known and a camera whose position and direction are known, and are not limited to the above-described examples. For example, the camera may be replaced with a 360-degree camera installed so that its position and direction (posture) are to be known. Further, the scanner may be a scanner mounted on the flying device in place of a ground-mounted scanner.

Although preferred embodiments of the present invention have been described above, the embodiments described above are examples of the present invention, and these embodiments can be combined based on the knowledge of a person skilled in the art, and such combined embodiments are also included in the scope of the present invention.

REFERENCE SIGNS LIST

4: Eyewear display device
31: Communication unit
41: Display
41a: Current-state image
41b: Inspection result image
41c: Correction supporting image
44: Communication unit
45: Relative position sensor
46: Relative direction sensor
51: Communication unit
52a: Sensor
60: Arithmetic processing unit
63: Communication unit
70: Three-dimensional bar arrangement design data generating device
71: Three-dimensional point cloud data
73: Bar arrangement design data
200: System
262: Three-dimensional coordinate measuring unit
S: Bar arrangement inspection result display system

The invention claimed is:

1. A bar arrangement inspection result display system comprising:
   a surveying instrument having a three-dimensional coordinate measuring function;
   an eyewear display device including a display, a relative position sensor configured to detect position of the eyewear display device, and a relative direction sensor configured to detect direction of the eyewear display device; and
   at least one processor configured to manage a coordinate space of information on the position and a direction of the eyewear display device and a coordinate space of the surveying instrument in a space with an origin set at a common reference point, wherein
   the processor is configured to:
   generate a three-dimensional model of a current state of a bar arrangement inspection range based on three-dimensional point cloud data of the bar arrangement inspection range acquired by a scanner in a state where a position and a direction of the scanner are known;
   generate three-dimensional inspection result display data by associating bar arrangement inspection result data of the bar arrangement inspection range in which detail and position of bar arrangement error are associated with each other with the three-dimensional model; and
   display three-dimensional inspection result display image by superimposing the three-dimensional inspection result display image on actual objects observed with the eyewear display on the display in such a manner that the bar arrangement error is recognizable.

2. The bar arrangement inspection result display system according to claim 1, wherein
   the processor generates correction supporting data for correcting the bar arrangement error based on three-dimensional bar arrangement design data of the inspection range, and
   based on the correction supporting data, displays a correction supporting image for supporting a work to correct the bar arrangement error on the display.

3. The bar arrangement inspection result display system according to claim 1, further comprising:
   a motion capture device, wherein
   the processor is capable of recognizing a worker's hand in a field of view of the eyewear display device by using the motion capture device, and
   recognizably displays a reinforcing bar that the worker has touched in the display.

4. The bar arrangement inspection result display system according to claim 2, further comprising:
   a motion capture device, wherein
   the processor is capable of recognizing a worker's hand in a field of view of the eyewear display device by using the motion capture device, and
   displays a work for correcting the bar arrangement error to the reinforcing bar that the worker has touched in the display.

5. The bar arrangement inspection result display system according to claim 1, wherein
the processor is capable of recognizing a worker's hand in a field of view of the eyewear display device by image processing, and
recognizably displays a reinforcing bar that the worker has touched in the display.

6. The bar arrangement inspection result display system according to claim 2, wherein
the processor is capable of recognizing a worker's hand in a field of view of the eyewear display device by image processing, and
displays a work for correcting the bar arrangement error to the reinforcing bar that the worker has touched in the display.

7. The bar arrangement inspection result display system according to claim 1, wherein
the bar arrangement inspection result data is generated as a result of identifying a bar arrangement state and positions of reinforcing bars included in a point cloud composite image that the three-dimension point cloud data of the inspection range and an image data of the inspection range by using a bar arrangement state identification model obtained as a result of learning a large number of point cloud composite images for learning created for various bar arrangement states and comparing the point cloud composite image of the inspection range with the bar arrangement design data of the inspection range.

8. The bar arrangement inspection result display system according to claim 1, further comprising:
at least one camera configured to acquire image data of the inspection range in a state where coordinates and a direction of the camera are known, wherein
the surveying instrument is a scanner configured to acquire three-dimensional point cloud data of an inspection range in a state where coordinates and a direction of the scanner are known, and
the processor is configured to
generate a point cloud composite image by combining the three-dimensional point cloud data with the image data, and
identify a bar arrangement state and positions of reinforcing bars included in the point cloud composite image, and, by comparing the point cloud composite image with the three-dimensional bar arrangement design data, generate the three-dimensional bar arrangement state inspection result data.

* * * * *